United States Patent
Jurkevicius et al.

(10) Patent No.: US 11,777,975 B1
(45) Date of Patent: Oct. 3, 2023

(54) IDENTIFYING MALICIOUS NODES IN A BLOCKCHAIN NETWORK

(71) Applicant: Humbility, UAB, Vilnius (LT)

(72) Inventors: Vladas Jurkevicius, Vilnius (LT); Lukas Deksnys, Vilnius (LT)

(73) Assignee: Humbility UAB, Vilnius (LT)

( * ) Notice: Subject to any disclaimer, the term of this patent is extended or adjusted under 35 U.S.C. 154(b) by 0 days.

(21) Appl. No.: 18/110,355

(22) Filed: Feb. 15, 2023

(51) Int. Cl.
*H04L 9/40* (2022.01)
*H04L 67/104* (2022.01)

(52) U.S. Cl.
CPC ...... *H04L 63/1425* (2013.01); *H04L 63/1441* (2013.01); *H04L 67/104* (2013.01)

(58) Field of Classification Search
CPC ............. H04L 63/1425; H04L 63/1441; H04L 67/1042; H04L 67/1044; H04L 67/1046; H04L 67/1048; H04L 67/1051; H04L 67/1053; H04L 67/1055; H04L 67/1057; H04L 67/1059; H04L 67/1061; H04L 67/1063; H04L 67/1065; H04L 67/1068; H04L 67/107; H04L 67/1072; H04L 67/1074; H04L 67/1076; H04L 67/1078; H04L 67/108; H04L 67/1082; H04L 67/1085; H04L 67/1087; H04L 67/1089; H04L 67/1091; H04L 67/1093
See application file for complete search history.

(56) References Cited

U.S. PATENT DOCUMENTS

| | | | |
|---|---|---|---|
| 10,929,842 B1* | 2/2021 | Arvanaghi | H04L 9/50 |
| 2022/0368532 A1* | 11/2022 | Heo | H04L 9/50 |

* cited by examiner

*Primary Examiner* — Esther B. Henderson
(74) *Attorney, Agent, or Firm* — The Pattani Law Group (57) ABSTRACT

A method including receiving, by a blockchain node from a peer blockchain node, a total amount of messages indicating blockchain transactions, the total amount of messages including at least one announcement message that contains an identifier to identify a blockchain transaction and at least one entire-transaction message that describes the blockchain transaction; determining, by the blockchain node based on receiving the total amount of messages, a first amount of announcement messages and a second amount of entire-transaction messages; calculating, by the blockchain node, a ratio of the second amount of messages to the total amount of messages; comparing, by the blockchain node, the calculated ratio to a predetermined threshold ratio; and determining, by the blockchain node based on a result of the comparison, whether a peer blockchain client utilized by the peer blockchain node has been modified is disclosed. Various other aspects are contemplated.

20 Claims, 4 Drawing Sheets

IDENTIFYING MALICIOUS NODES IN A BLOCKCHAIN NETWORK

FIELD OF DISCLOSURE

Aspects of the present disclosure generally relate to a blockchain network, and more particularly to identifying malicious nodes in a blockchain network.

BACKGROUND

A blockchain network may include nodes enabling a shared and distributed database. In an example, the nodes may independently store information associated with the blockchain network to assist with, for example, maintaining a secure and decentralized record. Information in the blockchain network may be shared among the nodes, each node verifying that its respective database is complete and accurate. In some cases, the nodes may be unable to edit (e.g., alter, delete, or destroy) the stored information. The shared and distributed database may enable redundancy while guaranteeing fidelity and security of the decentralized record to enable trust among the nodes without a need for an external third party.

SUMMARY

In one aspect, the present disclosure contemplates a method in a blockchain network, the method including receiving, by a blockchain node from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction; determining, by the blockchain node based at least in part on receiving the total amount of messages, a first amount of announcement messages received from the peer blockchain node and a second amount of entire-transaction messages received from the peer blockchain node; calculating, by the blockchain node, a ratio of the second amount of messages to the total amount of messages; comparing, by the blockchain node, the calculated ratio to a predetermined threshold ratio; and determining, by the blockchain node based at least in part on a result of the comparison, whether a peer blockchain client being utilized by the peer blockchain node to operate in the blockchain network has been modified.

In another aspect, the present disclosure contemplates a blockchain node in a blockchain network, the blockchain node comprising: a memory; and a processor communicatively coupled to the memory, the memory and the processor being configured to: receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction; determine, based at least in part on receiving the total amount of messages, a first amount of announcement messages received from the peer blockchain node and a second amount of entire-transaction messages received from the peer blockchain node; calculate a ratio of the second amount of messages to the total amount of messages; compare the calculated ratio to a predetermined threshold ratio; and determine, based at least in part on a result of the comparison, whether a peer blockchain client being utilized by the peer blockchain node to operate in the blockchain network has been modified.

In another aspect, the present disclosure contemplates a non-transitory computer-readable medium configured to store instructions, which when executed by a processor associated with a blockchain node in a blockchain network, configure the processor to: receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction; determine, based at least in part on receiving the total amount of messages, a first amount of announcement messages received from the peer blockchain node and a second amount of entire-transaction messages received from the peer blockchain node; calculate a ratio of the second amount of messages to the total amount of messages; compare the calculated ratio to a predetermined threshold ratio; and determine, based at least in part on a result of the comparison, whether a peer blockchain client being utilized by the peer blockchain node to operate in the blockchain network has been modified.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

Figure 1:
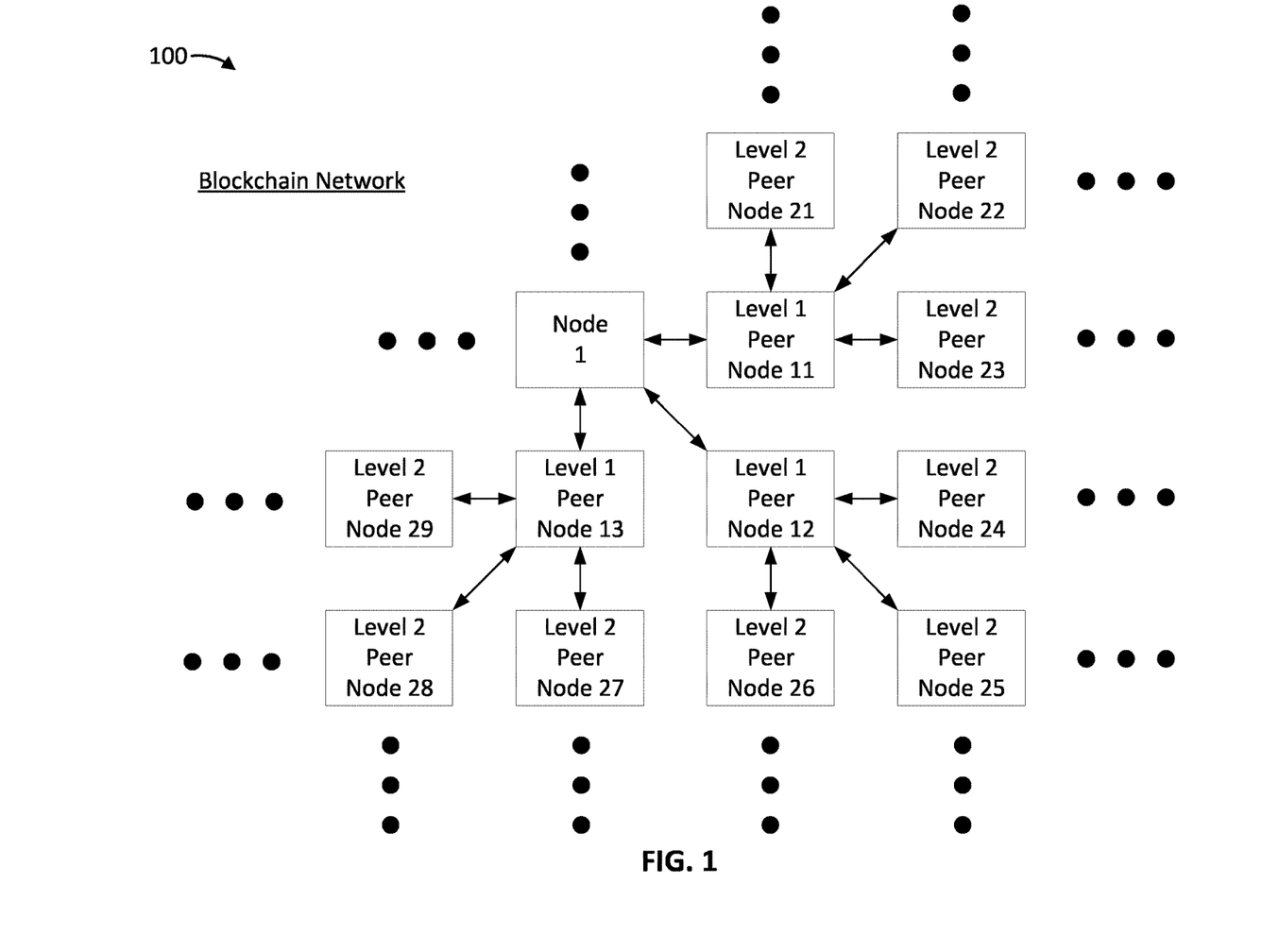
FIG. 1 is an illustration of an example system associated with identifying malicious nodes in a blockchain network, according to various aspects of the present disclosure.

FIG. 1 is an illustration of an example 100 associated with identifying malicious nodes in a blockchain network, according to various aspects of the present disclosure. Example 100 shows an architectural depiction of components included in the blockchain network. In some aspects, the blockchain network may include a peer-to-peer network of a plurality of interconnected nodes (e.g., computing devices). The nodes may utilize a network (e.g., Internet) to connect to the blockchain network.

In some aspects, the blockchain network may be managed by a blockchain managing application installed on a blockchain managing device (not shown) associated with a blockchain developer. The blockchain developer may utilize the blockchain managing application to configure and provide a common, default blockchain client to be utilized by each node to connect to and operate within the blockchain network. The default blockchain client may be configured to run a blockchain protocol specific to the blockchain network. Each node may install and execute the default blockchain client to run the blockchain protocol. Based at least in part on running the blockchain protocol, each node may, for example, discover, connect with, and/or communicate with other nodes in the blockchain network.

In some aspects, a given node (e.g., Node 1) may be interconnected with other nodes in the blockchain network at different levels (e.g., Level 1, Level 2, and so on). For instance, as shown in FIG. 1, Node 1 may be directly connected to Level 1 peer nodes, namely, Node 11, Node 12, and Node 13. Additionally, Node 1 may be directly connected to one or more other Level 1 peer nodes. In turn, each Level 1 peer node may be directly connected to respective Level 2 peer nodes. For instance, as shown in FIG. 1, Node 11 may be directly connected to Level 2 peer nodes, namely, Node 21, Node 22, and Node 23. Additionally, Node 11 may be connected to one or more other Level 2 peer nodes. Node 12 may be directly connected to Level 2 peer nodes, namely, Node 24, Node 25, and Node 26. Additionally, Node 12 may be connected to one or more other Level 2 peer nodes. Node 13 may be directly connected to Level 2 peer nodes, namely, Node 27, Node 28, and Node 29. Additionally, Node 13 may be connected to one or more other Level 2 peer nodes. Each of the Level 2 peer nodes may, in turn, be connected to Level 3 peer nodes in a similar and/or analogous manner.

The default blockchain client may enable nodes to communicate (e.g., transmit and/or receive) messages to indicate transactions taking place in the blockchain network. Such transactions may include transactions representing, for example, a contract and/or an agreement between two or more nodes, transfer of value among two or more nodes, exchange of assets among two or more nodes, and/or the like. For instance, Node 1 may act as a transmitting node and transmit a message indicating a transaction. In some aspects, the message may include an identifier that uniquely identifies the transaction. In some aspects, the message may include description data associated with the transaction (e.g., the entire transaction). Such description data may describe the entire transaction and/or may include data to enable the nodes to verify the transaction. Examples of the description data may include the identifier, information regarding nodes involved in the transaction, the nature of assets exchanged via the transaction, description of the transaction, etc.

The message transmitted by Node 1 may be received by one or more of the Level 1 peer nodes, Node 11, Node 12, and/or Node 13, directly connected to Node 1. In this case, the Level 1 peer nodes may be referred to as receiving nodes. When only the identifier is received, a receiving node may have the option to request and receive description data associated with the transaction from Node 1 or another node in the blockchain network. Based at least in part on receiving the description data, the Level 1 receiving nodes may independently verify the transaction by analyzing the description data and/or confirming an accuracy associated with the description data. Once confirmed, each of the Level 1 receiving nodes may independently transmit messages indicating the transaction (e.g., the identifier or the description data) to their respective Level 2 peers in the blockchain network. In a similar and/or analogous manner as the Level 1 receiving nodes, the Level 2 receiving nodes may independently verify the transaction by analyzing the description data and/or confirming an accuracy associated with the description data. Once confirmed, each of the Level 2 receiving nodes may independently transmit messages indicating the transaction (e.g., the identifier or the description data) to their respective Level 3 peers in the blockchain network. In a similar and/or analogous manner as the Level 2 receiving nodes, the Level 3 receiving nodes may independently verify the transaction by analyzing the description data and/or confirming an accuracy associated with the description data. As a result, all the nodes in the blockchain network, including one or more validator nodes that are responsible for validating transactions in the blockchain network, may receive and verify the data associated with the transaction. When the one or more validator nodes validate the transaction, all nodes in the blockchain network may independently store the data associated with the transaction in their respective storage devices. In this way, the transaction may become part of the blockchain record.

A node may include a computing device capable of hosting the common blockchain client and being associated with a respective storage device for storing information (e.g., transactions). In some aspects, the computing device may include, for example, a user device (e.g., client device) such as a laptop, a mobile phone, a tablet computer, a desktop computer, a smart device, or the like. In some aspects, the computing device may include Internet-of-Things (IoT) devices such as, for example, smart home appliances, smart home security systems, autonomous vehicles, smart health monitors, smart factory equipment, wireless inventory trackers, biometric cyber security scanners, or the like. In some aspects, the computing device may include a computer server associated with physical and/or virtual computer hardware and/or software capable of hosting data and/or applications and/or services related to the blockchain network.

Figure 4:
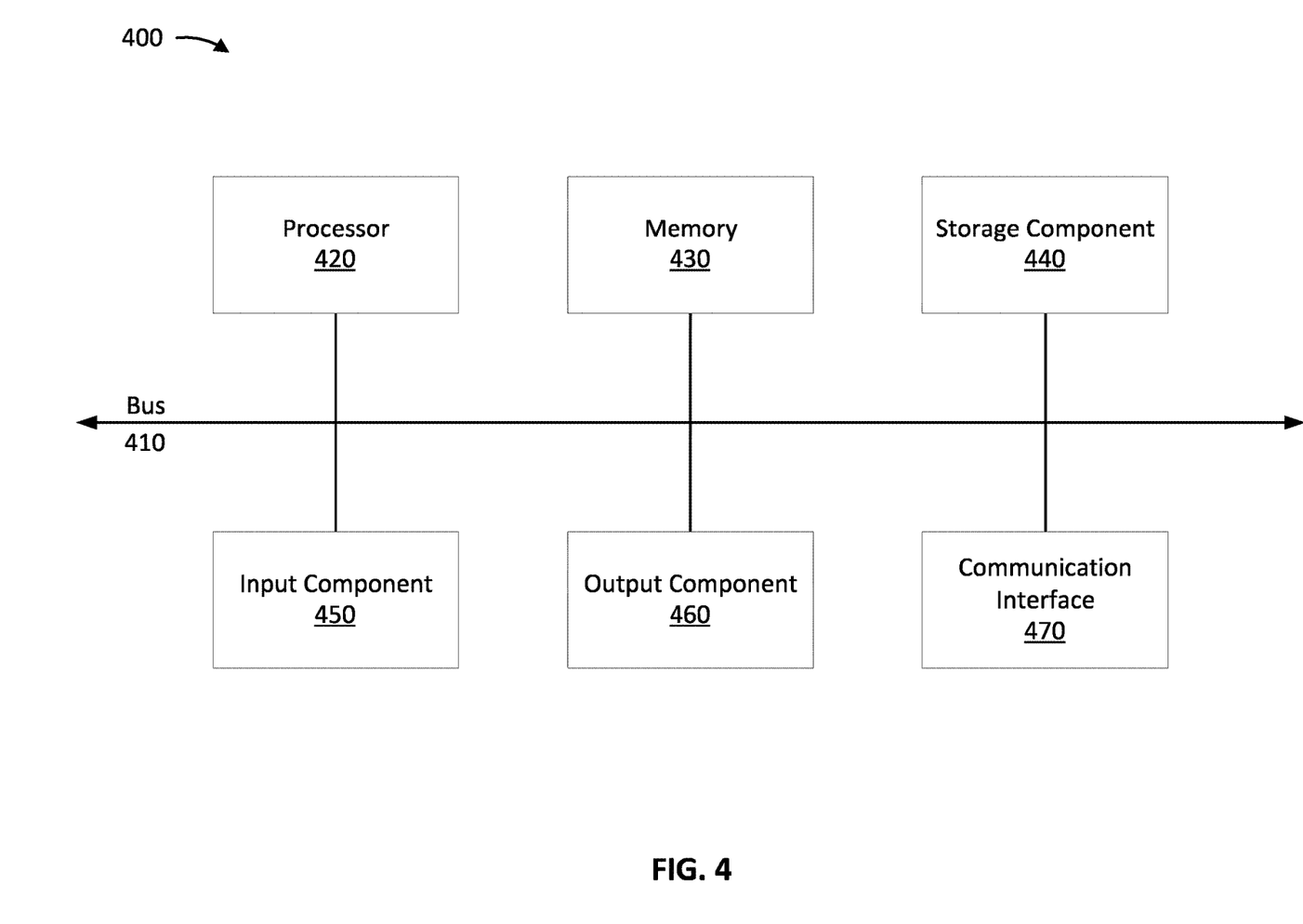
FIG. 4 is an illustration of example devices associated with identifying malicious nodes in a blockchain network, according to various aspects of the present disclosure.

One or more components (e.g., blockchain managing device, nodes, etc.) shown in FIG. 1 may further be associated with a controller/processor, a memory, a communication interface, or a combination thereof (e.g., FIG. 4). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a physical memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A given node may seek to connect with a blockchain network to, for example, carry out transactions therein. To that end, the given node may install a common blockchain client associated with the blockchain network. Further, the given node may execute the common blockchain client to connect and communicate with other nodes in the blockchain network.

When the given node is to inform the blockchain network about a transaction, the given node may function as a transmitting node and transmit a message including (i) an identifier that uniquely identifies the transaction (also referred to as an "announcement message"), or (ii) description data associated with the transaction (also referred to as an "entire-transaction message") to its Level 1 receiving nodes, which may independently receive and verify an accuracy of the description data.

In some instances, the given node may also function as a receiving node that independently receives announcement messages and/or entire-transaction messages from a peer transmitting node. In this case, the given/receiving node may independently verify the accuracy of the description data associated with the transaction.

To independently verify the accuracy of the data, the given/receiving node may independently analyze and confirm the data associated with the transaction. When only the announcement message is received, the given/receiving node may request and receive description data associated with the transaction from the peer transmitting node or another node in the blockchain network. The independent reception, analysis, and confirmation of the transaction by the given/receiving node may require the given/receiving node to utilize its node resources (e.g., processing resources, storage resources, power consumption resources, battery life, or the like).

In some cases, malicious nodes may connect to the blockchain network. Such malicious nodes may, for example, intentionally transmit invalid data, associated with invalid transactions, to be received, analyzed, and confirmed by its peer receiving nodes. The invalid data may include known deficiencies such as, for example, a missing signature. In another example, the invalid data may include duplicate data that is known to have been previously verified. The invalid data is destined to fail the verification process.

When the given/receiving node is directly connected to a malicious node, the given/receiving node may receive the invalid data associated with the invalid transactions. In this case, the given/receiving node may independently attempt to verify the invalid data, which is destined to fail the verification process. This results in inefficient utilizing of the node resources.

Also, transmission of such invalid data increases an amount of data communicated in the blockchain network, thereby inefficiently utilizing network resources (e.g., computational resources, network bandwidth, management resources, processing resources, storage resources, or the like). Additionally, due to communication of the invalid data in the blockchain network, a delay may be introduced in verification of valid data associated with valid transactions. To avoid such delay, the blockchain network may apply additional network resources to handle the invalid data, which network resources may otherwise be utilized for suitable tasks associated with the blockchain network.

Various aspects of systems and techniques discussed in the present disclosure enable identification of malicious nodes in a blockchain network. In some aspects, the techniques discussed herein may enable a given node to determine whether a peer node (also referred to as a "direct peer node" or a "Level 1 peer node") is a malicious node. In some aspects, the given node may determine that a peer node is a malicious node based at least in part on determining that a default blockchain client installed on the peer node (also referred to as a "peer client") has been modified. The modification may include a modification to a default configuration and/or a default source code associated with the common blockchain client. The given node may determine whether the peer client has been modified based at least in part on determining whether (i) messages received from the peer node satisfy a threshold ratio of an amount of entire-transaction messages with respect to a total amount of received messages; and/or (ii) an estimated number of peers (including the given node itself) directly connected to the peer node matches an actual number of peers (including the given node itself) directly connected to the peer node; and/or (iii) an amount of times a packet, included in a message received from the peer node, indicates a plurality of transactions satisfies a proportion threshold; and/or (iv) the peer node has retransmitted a previously transmitted message within a given time interval; and/or (v) the peer node has failed to transmit a given type of message within a given time duration; and/or (vi) the peer node, while acting as a receiving node, fails to appropriately verify a transaction. When the given node determines that the peer node is a malicious node, the given node may disconnect from being a direct peer with respect to the malicious node. In some aspects, the given node may commence discarding messages received from the peer node. As a result, the given node may avoid receiving and analyzing invalid data transmitted by the malicious node, thereby avoiding inefficient utilization of its node resources. Further, based at least in part on identification of the peer node as a malicious node, the given node may inform the blockchain managing device, which may disable the malicious node from operating in the blockchain network to avoid inefficient utilization of network resources with respect to handling the invalid data. A delay in verifying valid data associated with valid transactions may also be avoided. In this way, the present techniques may enable efficient utilization of node resources (e.g., processing resources, storage resources, power consumption resources, battery life, or the like) and network resources (e.g., computational resources, network bandwidth, management resources, processing resources, storage resources, or the like) for suitable tasks associated with the blockchain network.

In some aspects, a processor (e.g., processor 420) associated with a blockchain node may receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction; determine, based at least in part on receiving the total amount of messages, a first amount of announcement messages received from the peer blockchain node and a second amount of entire-transaction messages received from the peer blockchain node; calculate a ratio of the second amount of messages to the total amount of messages; compare the calculated ratio to a predetermined threshold ratio; and determine, based at least in part on a result of the comparison, whether a peer blockchain client being utilized by the peer blockchain node to operate in the blockchain network has been modified.

Figure 2:
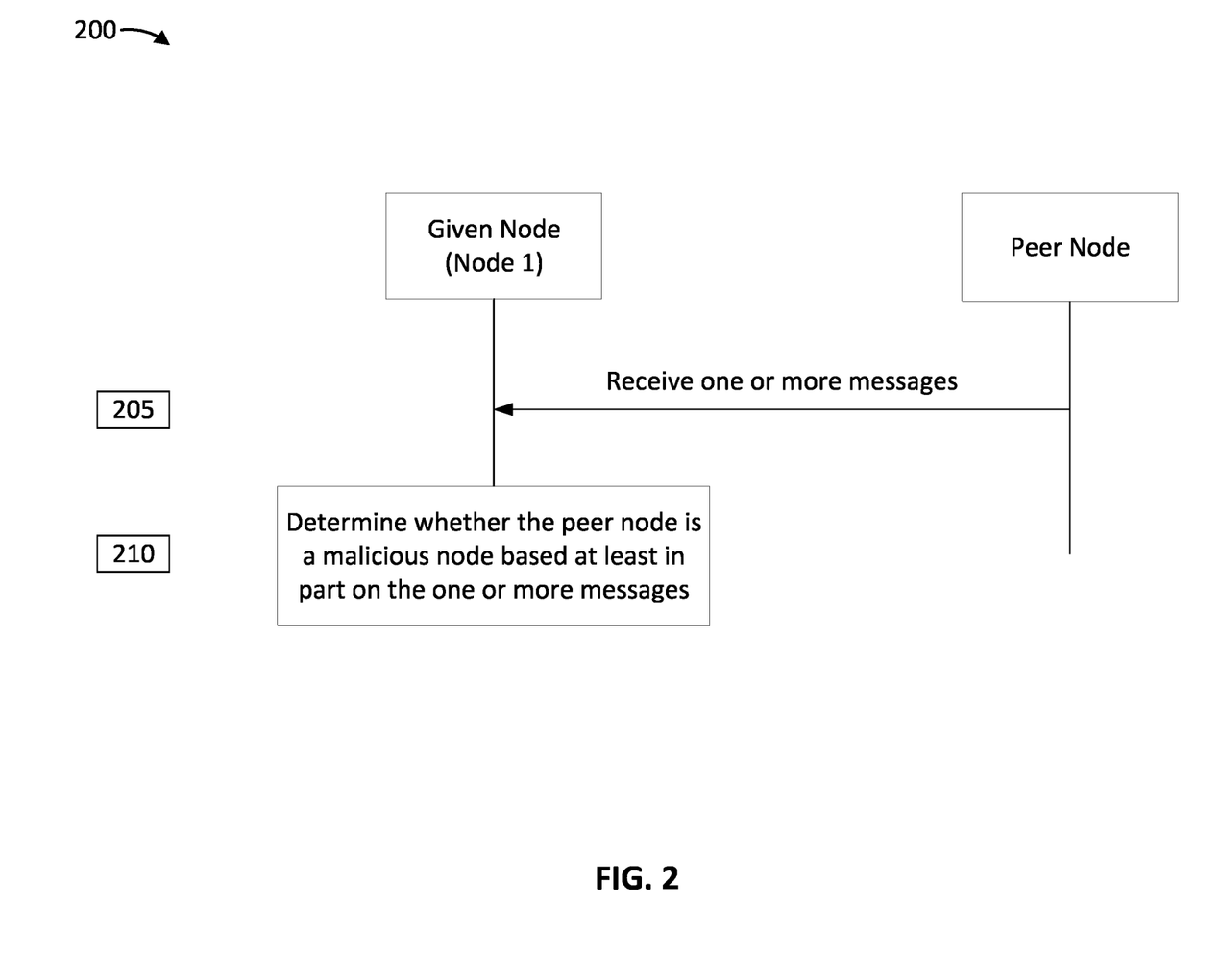
FIG. 2 is an illustration of an example flow associated with identifying malicious nodes in a blockchain network, according to various aspects of the present disclosure.

FIG. 2 is an illustration of an example flow 200 associated with identifying malicious nodes in a blockchain network, according to various aspects of the present disclosure. Example flow 200 includes a given node (e.g., Node 1) in communication with a peer node (e.g., Node 11, Node 12, Node 13, etc.) in the blockchain network. In some aspects, the given node may install a first instance of a default client associated with the blockchain network to connect and communicate with other nodes in the blockchain network. Similarly, the peer node may install a second instance of the default client (e.g., peer client) to connect and communicate with other nodes in the blockchain network.

As shown by reference numeral 205, the given node may function as a receiving node to receive one or more messages from the peer node. The one or more messages may indicate one or more transactions. In some aspects, the one or more messages may include announcement messages. In some aspects, the one or more messages may include entire-transaction messages.

As shown by reference numeral 210, the given node may determine whether the peer node is a malicious node based at least in part on the one or more messages. To determine whether the peer node is a malicious node, the given node may determine whether the peer client has been modified, and, to determine whether the peer client has been modified, the given node may utilize information associated with the one or more message.

In an example, to determine whether the peer client has been modified, the given node may determine whether the one or more messages fail to satisfy a threshold ratio of (i) an amount of entire-transaction messages to (ii) the total amount of messages. In some aspects, the blockchain network may configure the default blockchain client to transmit messages in accordance with the threshold ratio. As a result, nodes in the blockchain network that install and execute the default blockchain client are aware of the threshold ratio, and are to transmit messages in accordance with the threshold ratio when functioning as a transmitting node.

The threshold ratio may indicate an amount of times a transmitting node may transmit an entire-transaction message with respect to a total amount of transmitted messages. The transmitting node may not transmit entire-transaction messages in an amount that exceeds the threshold ratio. For instance, a threshold ratio of 50% may indicate that the transmitting node may not transmit entire-transaction messages in an amount that exceeds 50% of the total amount of transmitted messages. Similarly, a threshold ratio of 25% may indicate that the transmitting node may not transmit entire-transaction messages in an amount that exceeds 25% of the total amount of transmitted messages. Similarly, a threshold ratio of 10% may indicate that the transmitting node may not transmit entire-transaction messages in an amount that exceeds 10% of the total amount of transmitted messages. The blockchain network may predetermine the threshold ratio to regulate and/or control an amount of data communicated in the blockchain network.

While communicating in the blockchain network, the given node may receive a total amount of messages from the peer node. Based at least in part on analyzing the received total amount of messages, the given node may determine a first amount of messages that include announcement messages and/or a second amount of messages that include entire-transaction messages. The given node may calculate a ratio of the second amount of messages to the total amount of messages.

Further, the given node may compare the calculated ratio to the threshold ratio. Based at least in part on a result of the comparison, the given node may determine whether the peer client has been modified. In an example, the given node may determine that the peer client has not been modified when the result of the comparison indicates that the calculated ratio satisfies the threshold ratio (e.g., the calculated ratio is less than or substantially equal to the threshold ratio). In this case, the given node may determine that the peer node is not a malicious node. Alternatively, when the result of the comparison indicates that the calculated ratio fails to satisfy the threshold ratio (e.g., the calculated ratio is greater than the threshold ratio), the given node may determine that the peer client has been modified. In this case, the given node may determine that the peer node is a malicious node having a peer client that has been modified to transmit an excessive amount of entire-transaction messages.

In another example, to determine whether the peer client has been modified, the given node may determine whether an estimated number of peers (including the given node itself) directly connected to the peer node matches an actual number of peers (including the given node itself) directly connected to the peer node. In some aspects, the blockchain network may configure the default blockchain client to transmit announcement messages and/or entire-transaction messages in accordance with the actual number of directly connected peers. In an example, an amount of entire-transaction messages transmitted by the default blockchain client may substantially be equal to a square root of the actual number of directly connected peers. In other words, a transmitting node may not transmit an amount of entire-transaction messages that substantially exceeds the square root of the actual number of its directly connected peers. As a result, a peer node in the blockchain network that installs and executes the default blockchain client may determine the actual number of directly connected peers, and may transmit an amount of entire-transaction messages that is substantially equal to the square root of the actual number of directly connected peers. The blockchain network may configure the default blockchain client in this manner to regulate and/or control an amount of data communicated in the blockchain network.

While communicating in the blockchain network, the given node may receive a total amount of messages from the peer node over a particular period of time during which the peer node is associated with a particular amount of transactions. Based at least in part on analyzing the received total amount of messages, the given node may determine a first amount of messages that include announcement messages and/or a second amount of messages that include entire-transaction messages.

In some aspects, as a directly connected node to the peer node, the given node may calculate a probability of receiving entire-transaction messages based at least in part on calculating a value represented by (second amount)/(first amount+second amount). Further, the given node may estimate that the calculated value is equal to a ratio of a number of directly connected peers estimated to receive entire-transaction messages from the peer node to a total number of directly connected peers. The number of directly connected peers estimated to receive entire-transaction messages may be represented by "Y" and the total number of directly connected peers may be represented by "X." In this case, the given node may estimate that $$\frac{\text{(second amount)}}{\text{(first amount + second amount)}} = \frac{Y}{X}$$

Further, the given node may estimate that Y is equal to a square root of X. As a result, by replacing Y=√x, the given node may estimate that $$\frac{\text{(second amount)}}{\text{(first amount + second amount)}} = \frac{\sqrt{X}}{X}$$

$$\frac{\text{(second amount)}^\wedge 2}{\text{(first amount + second amount)}} = \frac{X}{X^\wedge 2}$$

$$\frac{\text{(second amount)}^\wedge 2}{\text{(first amount + second amount)}} = \frac{1}{X}$$

Now, solving for X, the given node may determine that $$\frac{\text{(first amount+second amount)}^\wedge 2}{\text{(second amount)}} = \frac{X}{1}$$

Based at least in part on determining the estimated number of directly connected peers, the given node may determine the actual number of directly connected peers. To do so, the given node may transmit, to the peer node, a query requesting the peer node to provide the given node with the actual number of peers directly connected to the peer node. Based at least in part on transmitting the query to the peer node, the given node may receive a response indicating the actual number of peers directly connected to the peer node.

The given node may compare the estimated number of directly connected peers with the actual number of directly connected peers. Based at least in part on a result of the comparison, the given node may determine whether the peer client has been modified. In an example, the given node may determine that the peer client has not been modified when the result of the comparison indicates that the estimated number of directly connected peers matches (e.g., is substantially equal to) the actual number of directly connected peers. In this case, the given node may determine that the peer node is not a malicious node. In another example, the given node may determine that the peer client has been modified when the result of the comparison indicates that the estimated number of directly connected peers fails to match (e.g., is substantially different from) the actual number of directly connected peers. In this case, the given node may determine that the peer node is a malicious node having a peer client that has been modified to transmit an excessive amount of entire-transaction messages.

In yet another example, to determine whether the peer client has been modified, the given node may determine whether an amount of times a packet, included in a message received from the peer node, indicates a plurality of transactions satisfies a proportion threshold. In some aspects, the blockchain network may configure the default blockchain client to transmit messages in accordance with the proportion ratio. As a result, nodes in the blockchain network that install and execute the default blockchain client are aware of the proportion ratio, and are to transmit messages in accordance with the proportion ratio when functioning as a transmitting node.

In some aspects, the blockchain network may configure the default blockchain client to transmit a message including a packet. Such packet may include, for example, an Internet protocol (IP) packet. The proportion ratio may indicate an amount of times a transmitting node may transmit a packet that indicates multiple transactions (e.g., indicate a single announcement message and a single entire-transaction message, and/or indicate multiple announcement messages, and/ or indicate multiple entire-transaction messages) with respect to a total amount of transmitted messages/packets. In some aspects, the transmitting node may not transmit a packet indicating multiple transactions in an amount that exceeds the proportion ratio. For instance, a proportion ratio of 5% may indicate that the transmitting node may not transmit a packet indicating multiple transactions in an amount that exceeds 5% of the total amount of transmitted packets. Similarly, a proportion ratio of 10% may indicate that the transmitting node may not transmit a packet indicating multiple transactions in an amount that exceeds 10% of the total amount of transmitted packets.

The blockchain network may configure the default blockchain client as such to enable fairness with respect to verification of transactions in the blockchain network. For instance, by indicating a single transaction in a packet, the blockchain network may facilitate verification of data associated with transactions received from different peer nodes, and avoid sequential verification of data associated with multiple transactions received from a single peer node.

While communicating in the blockchain network, the given node may receive a total amount of (messages including) packets from the peer node. Based at least in part on analyzing the received total amount of packets, the given node may determine a first amount of packets that indicate a single transaction (e.g., indicate a single announcement message or indicate a single entire-transaction message) and/or a second amount of packets that indicate multiple transactions (e.g., indicate a single announcement message and a single entire-transaction message, and/or indicate multiple announcement messages, and/or indicate multiple entire-transaction messages). The given node may calculate a ratio of the second amount of packets to the total amount of packets.

Further, the given node may compare the calculated ratio to the proportion ratio. Based at least in part on a result of the comparison, the given node may determine whether the peer client has been modified. In an example, the given node may determine that the peer client has not been modified when the result of the comparison indicates that the calculated ratio satisfies the proportion ratio (e.g., the calculated ratio is less than or substantially equal to the proportion ratio). In this case, the given node may determine that the peer node is not a malicious node. In another example, the given node may determine that the peer client has been modified when the result of the comparison indicates that the calculated ratio fails to satisfy the proportion ratio (e.g., the calculated ratio is greater than the proportion ratio). In this case, the given node may determine that the peer node is a malicious node having a peer client that has been modified to transmit a packet indicating an excessive amount of transactions.

In some aspects, the configuration may enable the default blockchain client to indicate a single transaction in the packet. As a result, nodes in the blockchain network that install and execute the default blockchain client are aware that a single transaction is to be indicated in a transmitted packet, and are to accordingly transmit packets when functioning as a transmitting node.

While communicating in the blockchain network, the given node may receive a packet from the peer node. Based at least in part on analyzing the received packet, the given node may determine whether the packet indicates a single transaction or whether the packet indicates multiple transactions.

When the packet indicates a single transaction, the given node may determine that the peer client has not been modified. In this case, the given node may determine that the peer node is not a malicious node. In another example, when the packet indicates multiple transactions, the given node may determine that the peer client has been modified. In this case, the given node may determine that the peer node is a malicious node having a peer client that has been modified to transmit a packet indicating an excessive amount of transactions.

In yet another example, to determine whether the peer client has been modified, the given node may determine whether the peer node has retransmitted a previously transmitted message within a given time interval (e.g., 5 minutes, 10 minutes, 15, minutes, 30 minutes, etc.). In some aspects, the blockchain network may configure the default blockchain client to wait for the given time interval prior to retransmitting a previously transmitted message. As a result, nodes in the blockchain network that install and execute the default blockchain client are aware of the given time interval, and are to wait for the given time interval prior to retransmitting a previously transmitted message when functioning as a transmitting node. The blockchain network may configure the default blockchain client as such to avoid transmission of redundant data in the blockchain network.

While communicating in the blockchain network, the given node may receive a message from the peer node. Based at least in part on analyzing the received message, the given node may determine whether the peer node has previously transmitted this received message within the given time interval.

When the given node determines that the peer node has not previously transmitted this received message within the given time interval, the given node may determine that the peer node is not a malicious node. Alternatively, when the given node determines that the peer node has previously transmitted this received message within the given time interval, the given node may determine that the peer node is a malicious node having a peer client that has been modified to transmit redundant messages.

In yet another example, to determine whether the peer client has been modified, the given node may determine whether the peer node has failed to transmit a given type of message within a given time duration (e.g., 1 minute, 2 minutes, 5 minutes, 10, minutes, 20 minutes, etc.). In some aspects, the blockchain network may configure the default blockchain client to transmit each type of message withing the given time duration. As a result, nodes in the blockchain network that install and execute the default blockchain client are aware of the given time duration, and are to transmit each type of message within the time duration when functioning as a transmitting node.

While communicating in the blockchain network, the given node may receive different types of messages from the peer node. The different types may include, for example, an announcement message, an entire-transaction message, a block announcement message indicating identifiers of transactions that have been validated by a validator node, a block transaction message including entire transactions that have been validated by a validator node and/or have been stored in the respective storage devices associated with the nodes, etc. Based at least in part on analyzing the received messages, the given node may determine whether the peer node has failed to transmit a given type of message within the given time duration.

When the given node determines that the peer node has not failed to transmit a given type of message within the given time duration, the given node may determine that the peer node is not a malicious node. Alternatively, when the given node determines that the peer node has failed to transmit a given type of message within the given time duration, the given node may determine that the peer node is a malicious node having a peer client that has been modified to suppress communication of the given type of message.

In yet another example, to determine whether the peer client has been modified, the given node may determine whether the peer node, while acting as a receiving node, fails to appropriately verify a transaction. In some aspects, the blockchain network may configure the default blockchain client to appropriately verify transactions indicated in received messages to enable efficient analysis and confirmation of transactions in the blockchain network. As a result, nodes in the blockchain network that install and execute the default blockchain client are to appropriately verify transactions when functioning as a receiving node.

In some aspects, the blockchain network may configure the default blockchain client to appropriately verify an indicated transaction based at least in part on determining that, for example, the transaction includes a valid signature of a node involved in the transaction, the valid signature being based at least in part on a private key associated with a wallet related to the node involved in the transaction. In some aspects, the blockchain network may configure the default blockchain client to appropriately verify an indicated transaction based at least in part on determining that, for example, sufficient funds are being utilized to carry out the transaction. In some aspects, the blockchain network may configure the default blockchain client to appropriately verify an indicated transaction based at least in part on determining that, for example, a nonce value associated with the indicated transaction matches a stored nonce value associated with an originator node is accurate. The nonce value may indicate a number of block transactions associated with the originator node that have become part of the blockchain record (e.g., have been indicated transaction being validated and/or stored in the respective storage devices). Failing to appropriately verify an indicated transaction may introduce a delay in the indicated transaction becoming part of the blockchain network.

While communicating in the blockchain network, the given node may act as a transmitting node and knowingly transmit an invalid transaction to the peer node for verification. After knowingly transmitting the invalid transaction, the given node may communicate with a second node directly connected to the peer node. Based at least in part on such communication, the given node may determine whether the peer node is a malicious node. For instance, when the communication indicates that the peer node failed to transmit a message indicating the invalid transaction as a verified transaction and/or for further verification by the second node, the given node may determine that the peer client appropriately identified the invalid transaction. As such, the given node may determine that the peer client is appropriately verifying transactions and/or that the peer client has not been modified. In this case, the given node may determine that the peer node is not a malicious node. Alternatively, when the communication indicates that the peer node transmitted a message indicating the invalid transaction as a verified transaction and/or for further verification by the second node, the given node may determine that the peer client failed to appropriately identify the invalid transaction. As such, the given node may determine that the peer client is not appropriately verifying transactions and/or that the peer client has been modified to transmit a message indicating a transaction without appropriately verifying description data associated with the transaction to, for example, conserve its node resources. In this case, the given node may determine that the peer node is a malicious node.

Based at least in part on determining that the peer node is a malicious node, in some aspects, the given node may disconnect from being a direct peer with respect to the malicious node. In some aspects, the given node may commence discarding messages received from the peer node.

In this way, the given node may avoid receiving and/or verifying invalid data transmitted by the malicious node, thereby avoiding inefficient utilization of its node resources. Further, based at least in part on identifying the malicious node, the blockchain network may disable the malicious node from operating in the blockchain network, thereby avoiding inefficient utilization of network resources with respect to handling the invalid data. A delay in verifying valid data associated with valid transactions may also be avoided. As a result, the present techniques may enable efficient utilization of node resources (e.g., processing resources, storage resources, power consumption resources, battery life, or the like) and network resources (e.g., computational resources, network bandwidth, management resources, processing resources, storage resources, or the like) for suitable tasks associated with the blockchain network.

As indicated above, FIG. 2 is provided as an example. Other examples may differ from what is described with regard to FIG. 2.

Figure 3:
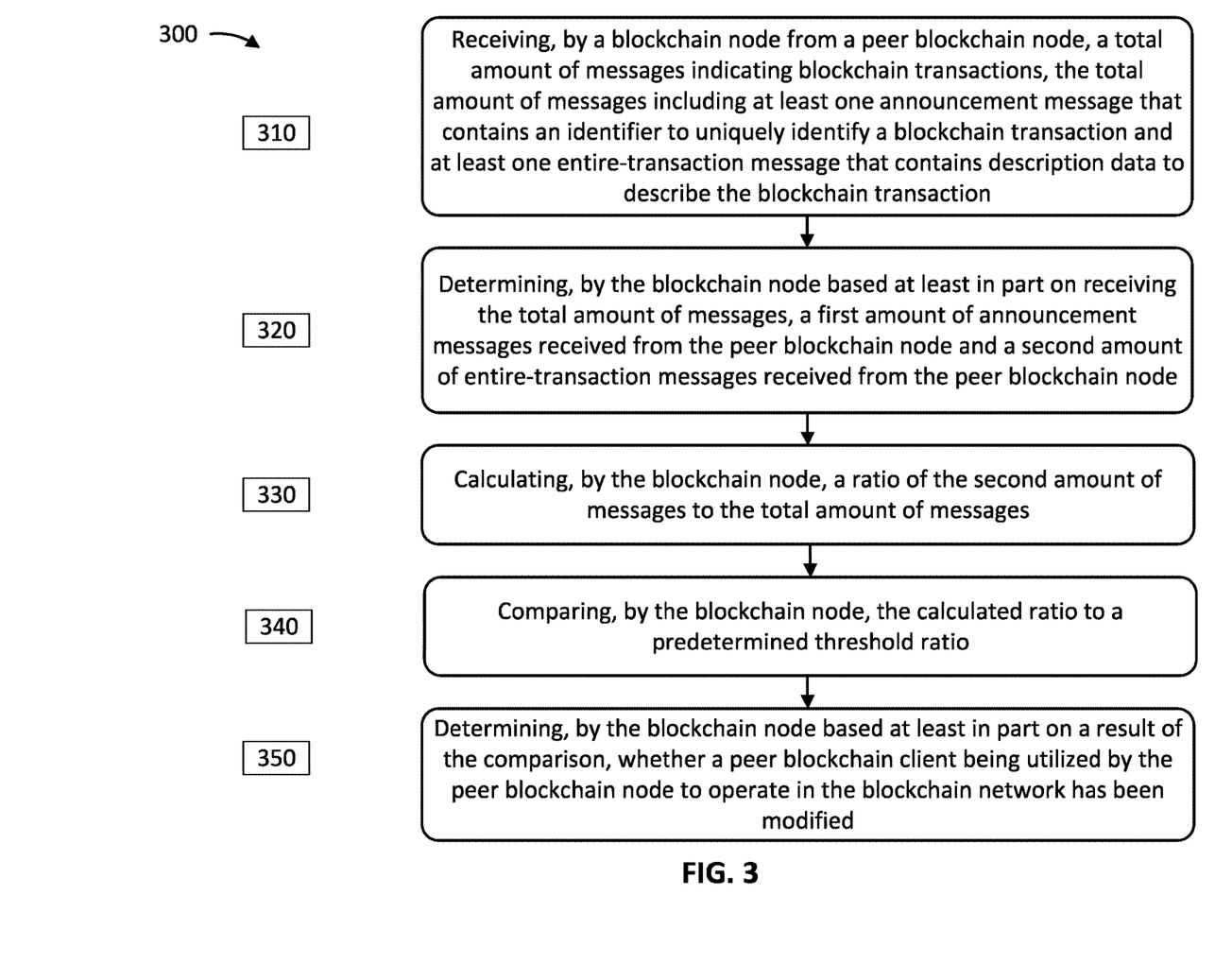
FIG. 3 is an illustration of an example process associated with identifying malicious nodes in a blockchain network, according to various aspects of the present disclosure.

FIG. 3 is an illustration of an example process 300 associated with identifying malicious nodes in a blockchain network, according to various aspects of the present disclosure. In some aspects, the process 300 may be performed by a memory (e.g., memory 430) and/or a processors (e.g., processor 420) associated with a blockchain node (e.g., Node 1) executing a default blockchain client. As shown by reference numeral 310, process 300 includes receiving, by a blockchain node from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction. For instance, the blockchain node may utilize an associated communication interface (e.g., communication interface 470) with the associated memory and/or processor to receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction, as discussed elsewhere herein.

As shown by reference numeral 320, process 300 includes determining, by the blockchain node based at least in part on receiving the total amount of messages, a first amount of announcement messages received from the peer blockchain node and a second amount of entire-transaction messages received from the peer blockchain node. For instance, the blockchain node may utilize the associated memory and/or processor to determine, based at least in part on receiving the total amount of messages, a first amount of announcement messages received from the peer blockchain node and a second amount of entire-transaction messages received from the peer blockchain node, as discussed elsewhere herein.

As shown by reference numeral 330, process 300 includes calculating, by the blockchain node, a ratio of the second amount of messages to the total amount of messages. For instance, the blockchain node may utilize the associated memory and/or processor to calculate a ratio of the second amount of messages to the total amount of messages, as discussed elsewhere herein.

As shown by reference numeral 340, process 300 includes comparing, by the blockchain node, the calculated ratio to a predetermined threshold ratio. For instance, the blockchain node may utilize the associated memory and/or processor to compare the calculated ratio to a predetermined threshold ratio, as discussed elsewhere herein.

As shown by reference numeral 350, process 300 includes determining, by the blockchain node based at least in part on a result of the comparison, whether a peer blockchain client being utilized by the peer blockchain node to operate in the blockchain network has been modified. For instance, the blockchain node may utilize the associated memory and/or processor to determine, based at least in part on a result of the comparison, whether a peer blockchain client being utilized by the peer blockchain node to operate in the blockchain network has been modified, as discussed elsewhere herein.

Process 300 may include additional aspects, such as any single aspect or any combination of aspects described below and/or in connection with one or more other processes described elsewhere herein.

In a first aspect, in process 300, the blockchain node is directly connected to the peer blockchain node in the blockchain network.

In a second aspect, alone or in combination with the first aspect, process 300 may include determining that the peer blockchain client has not been modified when the result of the comparison indicates that the calculated ratio satisfies the predetermined threshold ratio.

In a third aspect, alone or in combination with the first through second aspects, process 300 may include determining that the peer blockchain client has been modified when the result of the comparison indicates that the calculated ratio fails to satisfy the predetermined threshold ratio.

In a fourth aspect, alone or in combination with the first through third aspects, process 300 may include determining, based at least in part on determining that the peer blockchain client has not been modified, that the peer blockchain node is not a malicious node that transmits invalid data associated with invalid blockchain transactions.

In a fifth aspect, alone or in combination with the first through fourth aspects, process 300 may include determining, based at least in part on determining that the peer blockchain client has been modified, that the peer blockchain node is a malicious node that transmits invalid data associated with invalid blockchain transactions.

In a sixth aspect, alone or in combination with the first through fifth aspects, process 300 may include disconnecting from the peer blockchain node based at least in part on determining that the peer blockchain client has been modified.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of example devices 400 associated with identifying malicious nodes in a blockchain network, according to various aspects of the present disclosure. In some aspects, the example devices 400 may form part of or implement the systems, environments, infrastructures, components, devices or the like described elsewhere herein (e.g., blockchain network, blockchain managing device, nodes, etc.) and may be utilized for performing the example processes described elsewhere herein. The example devices 400 may include a universal bus 410 communicatively coupling a processor 420, a memory 430, a storage component 440, an input component 450, an output component 460, and a communication interface 470.

Bus 410 may include a component that permits communication among multiple components of a device 400. Processor 420 may be implemented in hardware, firmware, and/or a combination of hardware and software. Processor 420 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 420 may include one or more processors capable of being programmed to perform a function. Memory 430 may include a random access memory (RAM), a read only memory (ROM), and/or another type of dynamic or static storage device (e.g., a flash memory, a magnetic memory, and/or an optical memory) that stores information and/or instructions for use by processor 420.

Storage component 440 may store information and/or software related to the operation and use of a device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 may include a component that permits a device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 may include a component that provides output information from device 400 (via, for example, a display, a speaker, a haptic feedback component, an audio or visual indicator, and/or the like).

Communication interface 470 may include a transceiver-like component (e.g., a transceiver, a separate receiver, a separate transmitter, and/or the like) that enables a device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

A device 400 may perform one or more processes described elsewhere herein. A device 400 may perform these processes based at least in part on processor 420 executing software instructions stored by a non-transitory computer-readable medium, such as memory 430 and/or storage component 440. As used herein, the term "computer-readable medium" may refer to a non-transitory memory device. A memory device may include memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 4 are provided as an example. In practice, a device 400 may include additional components, fewer components, different components, or differently arranged components than those shown in FIG. 4. Additionally, or alternatively, a set of components (e.g., one or more components) of a device 400 may perform one or more functions described as being performed by another set of components of a device 400.

As indicated above, FIG. 4 is provided as an example. Other examples may differ from what is described with regard to FIG. 4.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A blockchain node in a blockchain network, the blockchain node comprising:
   a memory; and
   a processor communicatively coupled to the memory, the memory and the processor being configured to:
      receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction;
      determine, based at least in part on receiving the total amount of messages, a first amount of announcement messages received from the peer blockchain node and a second amount of entire-transaction messages received from the peer blockchain node;
      calculate a ratio of the second amount of messages to the total amount of messages;
      compare the calculated ratio to a predetermined threshold ratio; and
      determine, based at least in part on a result of the comparison, whether a peer blockchain client being utilized by the peer blockchain node to operate in the blockchain network has been modified.

2. The blockchain node of claim 1, wherein the blockchain node is directly connected to the peer blockchain node in the blockchain network.

3. The blockchain node of claim 1, wherein the memory and the processor are configured to determine that the peer blockchain client has not been modified when the result of the comparison indicates that the calculated ratio satisfies the predetermined threshold ratio.

4. The blockchain node of claim 1, wherein the memory and the processor are configured to determine that the peer blockchain client has been modified when the result of the comparison indicates that the calculated ratio fails to satisfy the predetermined threshold ratio.

5. The blockchain node of claim 1, wherein the memory and the processor are configured to determine, based at least in part on determining that the peer blockchain client has not been modified, that the peer blockchain node is not a malicious node that transmits invalid data associated with invalid blockchain transactions.

6. The blockchain node of claim 1, wherein the memory and the processor are configured to determine, based at least in part on determining that the peer blockchain client has been modified, that the peer blockchain node is a malicious node that transmits invalid data associated with invalid blockchain transactions.

7. The blockchain node of claim 1, wherein the memory and the processor are configured to disconnect from the peer blockchain node based at least in part on determining that the peer blockchain client has been modified.

8. A method in a blockchain network, the method comprising:
   receiving, by a blockchain node from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction;

determining, by the blockchain node based at least in part on receiving the total amount of messages, a first amount of announcement messages received from the peer blockchain node and a second amount of entire-transaction messages received from the peer blockchain node;

calculating, by the blockchain node, a ratio of the second amount of messages to the total amount of messages;

comparing, by the blockchain node, the calculated ratio to a predetermined threshold ratio; and determining, by the blockchain node based at least in part on a result of the comparison, whether a peer blockchain client being utilized by the peer blockchain node to operate in the blockchain network has been modified.

9. The method of claim 8, wherein the blockchain node is directly connected to the peer blockchain node in the blockchain network.

10. The method of claim 8, further comprising:
determining that the peer blockchain client has not been modified when the result of the comparison indicates that the calculated ratio satisfies the predetermined threshold ratio.

11. The method of claim 8, further comprising:
determining that the peer blockchain client has been modified when the result of the comparison indicates that the calculated ratio fails to satisfy the predetermined threshold ratio.

12. The method of claim 8, further comprising:
determining, based at least in part on determining that the peer blockchain client has not been modified, that the peer blockchain node is not a malicious node that transmits invalid data associated with invalid blockchain transactions.

13. The method of claim 8, further comprising:
determining, based at least in part on determining that the peer blockchain client has been modified, that the peer blockchain node is a malicious node that transmits invalid data associated with invalid blockchain transactions.

14. The method of claim 8, further comprising:
disconnecting from the peer blockchain node based at least in part on determining that the peer blockchain client has been modified.

15. A non-transitory computer-readable medium configured to store instructions, which when executed by a processor associated with a blockchain node in a blockchain network, configure the processor to:

receive, from a peer blockchain node, a total amount of messages indicating blockchain transactions, the total amount of messages including at least one announcement message that contains an identifier to uniquely identify a blockchain transaction and at least one entire-transaction message that contains description data to describe the blockchain transaction;

determine, based at least in part on receiving the total amount of messages, a first amount of announcement messages received from the peer blockchain node and a second amount of entire-transaction messages received from the peer blockchain node;

calculate a ratio of the second amount of messages to the total amount of messages;

compare the calculated ratio to a predetermined threshold ratio; and determine, based at least in part on a result of the comparison, whether a peer blockchain client being utilized by the peer blockchain node to operate in the blockchain network has been modified.

16. The non-transitory computer-readable medium of claim 15, wherein the blockchain node is directly connected to the peer blockchain node in the blockchain network.

17. The non-transitory computer-readable medium of claim 15, wherein the processor is configured to determine that the peer blockchain client has not been modified when the result of the comparison indicates that the calculated ratio satisfies the predetermined threshold ratio.

18. The non-transitory computer-readable medium of claim 15, wherein the processor is configured to determine that the peer blockchain client has been modified when the result of the comparison indicates that the calculated ratio fails to satisfy the predetermined threshold ratio.

19. The non-transitory computer-readable medium of claim 15, wherein the processor is configured to determine, based at least in part on determining that the peer blockchain client has not been modified, that the peer blockchain node is not a malicious node that transmits invalid data associated with invalid blockchain transactions.

20. The non-transitory computer-readable medium of claim 15, wherein the processor is configured to determine, based at least in part on determining that the peer blockchain client has been modified, that the peer blockchain node is a malicious node that transmits invalid data associated with invalid blockchain transactions.

* * * * *